United States Patent [19]

DeJong

[11] Patent Number: 4,878,514

[45] Date of Patent: Nov. 7, 1989

[54] HEATER CONTROL VALVE WITH FLEXIBLE DEFLECTOR

[75] Inventor: Allan W. DeJong, Chatham, Canada

[73] Assignee: Siemens-Bendix Automotive Electronics Limited, Chatham, Ontario, Canada

[21] Appl. No.: 246,580

[22] Filed: Sep. 19, 1988

[51] Int. Cl.$^4$ .................. G05D 7/01; F16K 11/052
[52] U.S. Cl. .................. 137/110; 137/117; 137/625.44; 165/38
[58] Field of Search .................. 137/110, 625.44, 117, 137/625.29, 484.4, 599.1, 522, 523; 165/38; 251/120

[56] References Cited

U.S. PATENT DOCUMENTS

| | | | |
|---|---|---|---|
| 1,040,548 | 10/1912 | Jones | 137/625.44 X |
| 2,246,802 | 6/1941 | Kehm et al. | 137/625.44 X |
| 2,748,800 | 6/1956 | Allen | 137/625.44 X |
| 3,868,991 | 3/1975 | Sheppard | 137/512.15 X |
| 3,908,688 | 9/1975 | Gandrud | 137/110 |
| 3,972,344 | 8/1976 | Chauvigné | 137/625.44 X |

Primary Examiner—Stephen M. Hepperle
Attorney, Agent, or Firm—Russel C. Wells; George L. Boller

[57] ABSTRACT

A heater control valve comprising: a valve body defining a chamber and a bypass passage extending therefrom. A first conduit in fluid communication with the bypass passage for defining a first inlet port and a first exit port adapted to communicate coolant to an external device. A flexible divertor mounted in the bypass passage and extending into the first conduit for diverting fluid into the bypass passage as a function of flow rate. A second conduit, in communication with the chamber defining a second inlet adapted to receive flow from the external device and a second outlet. The valve body further including a first seating surface disposed about an upstream end of the bypass passage and a second seating surface disposed about the second inlet, and a bypass valve, rotatable from a first position in sealing engagement with the first seating surface to a second position in sealing engagement with the second seating surface, and an actuator, for rotating the bypass valve from the first position to the second position in response to control signals.

10 Claims, 1 Drawing Sheet

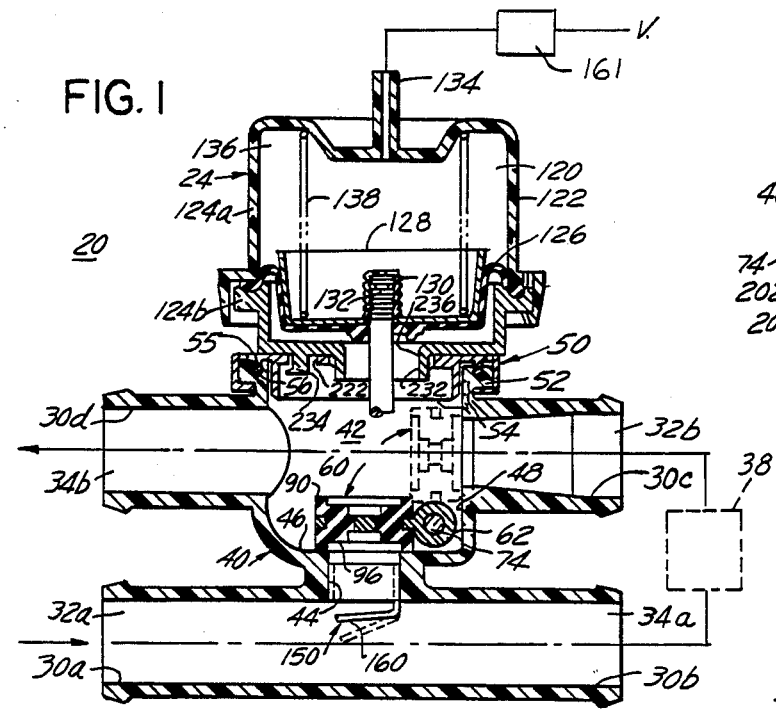
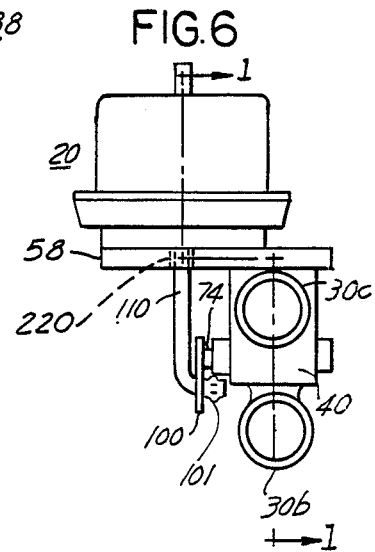
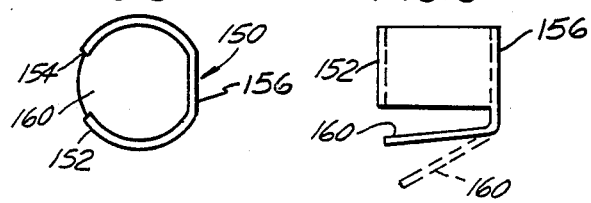
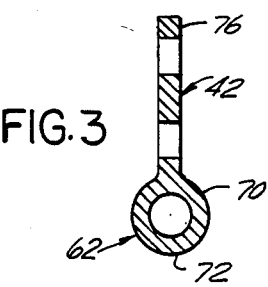
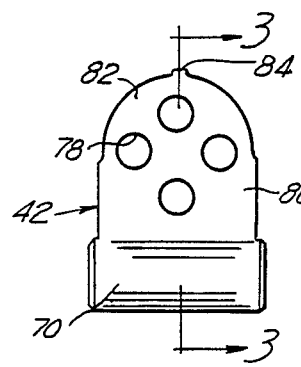
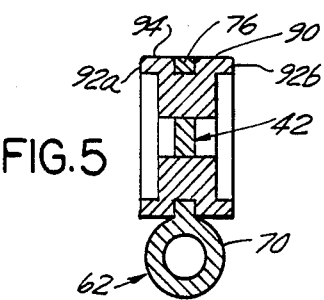
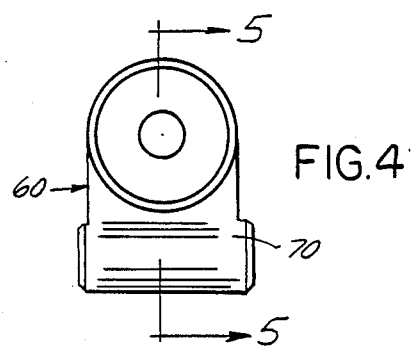

HEATER CONTROL VALVE WITH FLEXIBLE DEFLECTOR

BACKGROUND AND SUMMARY OF THE INVENTION

The present invention relates generally to flow control valves and more particularly to a flow control valve which regulates coolant flow to a heater core and is generally related to the common assigned patent application U.S. Ser. No. 199,216 which is incorporated herein by reference.

Heater cores such as those used in automotive vehicles receive hot coolant from the engine. The rate of coolant flow is proportional to engine speed (rpm). It is known that over the life of a vehicle the coolant may be contaminated with particles of grit, rust, etc. which also flow through the core. In order to increase the useful life of the heater core and protect it, it is necessary to limit the flow rate of the coolant through the heater core to reduce erosion due to the impact of the particles with portions of the core. Further, during the useful life of the heater core sediment within the coolant may accumulate on the various internal passages of the heater core which tends to restrict the flow of coolant therethrough. Consequently, as the heater core ages the pressure drop across the core increases. It is also useful to limit the maximum flow rate of coolant through the heater core to maintain the pressure within the core at reasonable levels otherwise the core may flex, leak or fatigue prematurely. It has been found that if the flow rate of coolant is restricted to approximately 5-6 gallons/minute (19-23 liters per minute) heater core useful life can be increased. The above relationship has been appreciated for some time. Current heating systems utilize a rubber orifice flow control washer. This device provides a restriction at all flow rates. As the flow pressure increases the rubber compresses causing the flow area (orifice diameter) to decrease thus limiting the flow to the required amount. While the rubber orifice functions to limit the maximum flow rate of coolant, it also provides a significant restriction to the flow of coolant at lower engine rpm thus restricting the amount of coolant communicated to the heater and reducing its performance.

It is an object of the present invention to provide a flow control valve for a heater core which maximizes flow at low engine rpm and which limits coolant flow to approximately 6 gallons per minute at high engine rpm in conjunction with a flexible, self-regulating deflector. Another object of the present invention is to controllably terminate coolant flow to the heater core under certain conditions such as when maximum air conditioning performance is required.

Accordingly, the invention comprises: a fluid control valve comprising: a valve body defining a chamber and a bypass passage, for receiving fluid, extending therefrom, first conduit means, in fluid communication with the bypass passage, for defining a first inlet adapted to receive fluid and a first outlet adapted to communicate fluid to an external device; second conduit means, in communication with the chamber for defining a second inlet, adapted to receive flow from the external device, and a second outlet; the valve body further including a first seating surface within the chamber, disposed about an upstream end of the bypass passage and a second seating surface disposed about the second inlet within the chamber; flow control means for regulating the flow rate of fluid, from the first inlet to the first exit, to a maximum value, and for prohibiting fluid flow through the external device by terminating fluid communication between the second inlet and second outlet and first means including a divertor means, deflectable in response to fluid flow, for diverting fluid into the bypass passage as a function of the rate of fluid flow through the first conduit means.

Many other objects and purposes of the invention will be clear from the following detailed description of the drawings.

BRIEF DESCRIPTION OF THE DRAWINGS

In The Drawings:

FIG. 1 is a cross-sectional view of one embodiment of a flow control valve constructed in accordance with the present invention. and is taken in the direction of arrows 1-1 in FIG. 6.

FIG. 2 through 5 illustrate various views of a bypass valve used in the above flow valves.

FIG. 6 illustrates a side elevational view of the flow valve.

FIG. 7 illustrates a portion of the flow control valve.

FIGS. 8 and 9 illustrate various views of the divertor shown in FIG. 1.

DETAILED DESCRIPTION OF THE DRAWINGS

With regard to FIG. 1 there is illustrated a flow valve generally shown as 20. The flow valve 20 comprises a valve body 22 and on actuator assembly 24. Only a portion of the actuator assembly 24 is shown in FIG. 1 since it extends forward of the valve body (see FIG. 6). The valve body includes a plurality of tubes or conduits connected in an "H" configuration. A lower tube 30 having right and left hand portions 30a abd b is connected to the upper tubes 30c and 30d via a bypass body section generally illustrated as 40. The bypass body section 40 includes a central cavity 42 in direct communication with the tubes 30c and 30d. The valve 20 further includes a cap 50 which comprises a generally rectangular first portion 52 which may be snap-fit about a shoulder 54 formed about the upper portion of the bypass body section to enclose the cavity 42. Appropriate sealing such as a rubber gasket to O-ring 56 may be used to enhance the seal. The O-ring 56 may be pressed by a bead 55. The cap 50 further includes a second portion 58 which extends from the first portion to cantilever mount the actuator assembly. The second portion includes a central opening 220, to receive a stem 110 of the actuator assembly, and a plurality of accuate openings 222 positioned thereabout.

The bypass body section further includes a bypass passage 44 in communication with tubes 30a and 30b. The lower portion of the chamber 42 proximate the bypass passage 44 defines a seating surface 46. Similarly the portion of the bypass body section proximate the innermost portion of tube 30c defines a second seating surface 48. The lower tube 30 forms a single conduit forming at one end a first inlet 32a and at another end a first outlet 34a. Tubes 30c and 30d define another conduit having a second inlet 32b and outlet 34b. The inner diameter of tube 30c may be tapered from the second inlet 32b to the second seating surface 48.

Rotatably secured within the bypass body section 40 is a bypass valve generally shown as 60. The bypass valve 60 includes a door hinge 62 (shown in greater detail in FIGS. 2 and 3) and the two rotate as a unit. As can be seen more clearly in FIGS. 2 and 3, the door hinge includes a cylindrical eyelet portion 70 defining an opening 72 for receipt of a hinge pin 74 (shown more clearly in FIG. 1 and 6). Extending from the eyelet portion 70 is a relatively flat member 76 comprising a plurality of openings 78d the purpose of which will be described below. The flat member 76 comprises a generally rectangular portion 80 extending from the eyelet 70 and a generally semicicular portion 82. The diameter of the semicircular portion may be slightly less than the width of the rectangular portion 80. The semicircular portion 82 further includes at least one protuberance 84.

The hingle pin 74 is fluidly and rotatably sealed in the bypass body section 40. The bypass body section, as shown in FIG. 7, includes a first cylindrical projection 200 defining a stepped bore 202 and opening 204. Positioned oppositely is a second cylindrical projection 206 defining a blind bore 208. During fabrication of the valve 20 the bypass valve 60 is inserted into the chamber 42 and aligned to the opening 204. The hinge pin 74 with an O-ring 210 is inserted into the stopped bore 208. The hinge pin 74 may include a serrated edge 21 or similar connecting means, which engages the eyelet 70.

The bypass valve 60 further includes a resilient sealing member 90 shown in FIGS. 1, 4 and 5. The sealing member 90 includes oppositely extending annular sealing surfaces 92a and 92b. The sealing member 90 may be injection moulded to the door hinge 62 such that the resilient material fills the opening 78 thereby securing the resiliant material thereto. As mentioned above, the sealing member 90 has a generally circular profile and it is desirable that the outer edge 94 of the member 90 be formed essentially tangential to the protuberance 84 of the door hinge 80.

The door hinge 62 is rotatable with the hinge pin 74 which extends through the bypass body section 40. Attached to one end of the hinge pin 74 is a bell crank lever 100. The bell crank lever may include an opening 102 of prescribed shape to receive a similarly formed end of the hinge pin 74. The bell crank lever 100 further includes another opening 10 to receive a portion of an actuator stem 110.

As mentioned above, the valve 20 includes an actuator assembly 24. As illustrated in the accompanying figures, the actuator assembly comprises a vacuum motor 120 comprising a multipart housing 122 (housing portions 124a and b) which secure therebetween a rolling diaphragm 126. The lower housing portion 124b is adapted to be supported by the cap 50. More particularly the lower housing portion 124b includes a flange 230 and opening 232 received into the opening 220 of the cap 50. In addition the lower housing portion 124b includes a plurality of barbs 234 adapted to fit into the openings 220 thereby securing the actuator assembly 24 to the cap 50. While a vacuum motor 120 is shown it should be appreciated that electric actuators such as steeper motors or solenoids can be used to actuate the stem 110.

Attached to the upper side of the diaphragm is a cup-shaped piston 128 comprising a threaded bore 130 adapted to receive one end 132 of the stem 110.

The vacuum motor 120 further includes a vacuum inlet port 134 adapted to communicate vacuum to a chamber 136 partially defined by the diaphragm 126. A spring 138 biases the diaphragm 126 and stem 110 downwardly in a manner to urge the bypass valve 60 to seat upon the seating surface 46 as illustrated in FIG. 1.

With reference to FIG. 1, the valve 20 may further include a flexible disk shaped baffle, deflector or divertor 150. As illustrated in FIGS. 8 and 9 the baffle 150 comprises an upper substantially cylindrical member 152. The divertor or baffle 150 is preferably fabricated of a spring-like steel and the upper member 152 comprises an open side 154 and an opposite flat side 156. The divertor 150 is adapted to be slidably received within the bypass passage 44. The baffle 150 further includes a flexible deflector 160 integrally extending from the cylindrical portion 152. The deflector extends into the fluid stream within the lower tube 30 to divert fluid into the bypass passage. Due to the inherent resiliency of the deflector 160, it will bend downwardly, as illustrated (by the phantom lines) in FIGS. 1 and 9 in response to this increased flow.

In operation coolant is pumped from the engine at a rate proportional to engine speed and is received at the inlet 32a. At low engine speed (low flow rate) the deflector will be maintained in an orientation such as illustrated (by the solid lines) in FIG. 1 and consequently a relatively small amount of the fluid will impact the deflector 150 and be diverted upwardly into passage 44 and thereafter out of the end 34a of tube 30b into the heater core. The flow from the heater core returns to the valve 20 through the inlet 32b of tube 30c and exits the valve 20, at 34b, and is communicated to a radiator. Communication to the heater core may be effected with rubber hoses or the like attached to the first outlet 34a and second inlet 32b. Communication to the radiator may similarly be obtained by connection to the second outlet 34b. Without vacuum applied to the port 134, the spring 138 biases the stem 110 downwardly in a manner to urge the valve 60 to close the bypass passage 44. As engine speed increases the rate of fluid flow will increase through tube 30a as will the upward force of that portion of the coolant diverted into the bypass passage 44. The spring 138 in the vacuum valve 120 and the effective length of the bell crank lever have been set to maintain the valve 60 in its closed position for flow rates below approximately 5 gallons per minute. As the engine speed increases the fluid or coolant flow rate will similarly increase thereby further urging the deflector 160 (as mentioned above) to a lower position thereby permitting additional fluid to be diverted upwardly onto the lower face of the valve 60 thereby causing the valve 60 to rotate clockwise as viewed in FIG. 1, against the bias force of the spring 30 thereby opening the bypass passage 44 regulating the coolant flow rate communicated to the core at approximately 5 to 6 gallons per minute. For many vehicles at maximum rpm, the engine will generate a coolant flow in the vacinity of 15 to 16 gallons per minute. In operation the valve 20 will limit the flow to the core at less than 6 gallons per minute while bypassing, through the bypass passage 44, up to 10 gallons per minute.

At low engine rpm, that is, at engine rpm below the level that would cause the valve 60 to open, it is desirable that the valve 20 does not restrict the flow of fluid to the core 38. As can be seen from the above this function is also accomplished by the deflector 160 Since at low flow condition the deflector will attain its most streamlined orientation to the input flow thereby presenting a low restriction flow path for the fluid during this condition.

During engine operating conditions such as maximum air conditioning performance when it is desired to completely terminate flow through the heater core engine vacuum is supplied to the vacuum port 134 through a control unit such as to an electric vacuum controller 161 of known variety. The vacuum so communicated to the vacuum motor 120 causes the diaphragm 126 and stem 110 to move upwardly thereby rotating the lever 100 and valve 60 to seat against the sealing surface 48 thereby prohibiting flow through the core 38. In this mode of operation all of the engine coolant is diverted to the radiator through the bypass passage 44.

Many changes and modifications in the above described embodiment of the invention can, of course, be carried out without departing from the scope thereof. Accordingly, that scope is intended to be limited only by the scope of the appended claims.

I claim:

1. A fluid control valve comprising:
   a valve body defining a chamber and a bypass passage, for receiving fluid, extending therefrom,
   first conduit means, in fluid communication with the bypass passage, for defining a first inlet adapted to receive fluid and a first outlet adapted to communicate fluid to an external device;
   second conduit means, in communication with the chamber for defining a second inlet, adapted to receive flow from the external device, and a second outlet;
   the valve body further including a first seating surface, within the chamber, disposed about a downstream end of the bypass passage and a second seating surface disposed about the second inlet within the chamber;
   flow control means for regulating the flow rate of fluid, from the first inlet to the first outlet, to a maximum value, and for prohibiting fluid flow through the external device by terminating fluid communications between the second inlet and second outlet and first means including a resilient divertor means deflectable in response to fluid flow, for diverting fluid into the bypass passage as a function of the rate of fluid flow through the first conduit means.

2. The valve as defined in claim 1 wherein the divertor means includes a divertor deflectable from a first position, offering a nominal resistance to flow in the first conduit means to a second position offering greater resistance thereby diverting less or more fluid, as the case may be, into the bypass passage.

3. The valve as defined in claim 2 wherein the divertor means includes a hollow cylindrical member adapted to be received into the bypass passage and a flexible plate, forming the divertor, extending therefrom.

4. The valve as defined in claim 3 wherein the cylindrical member includes an open side.

5. The valve as defined in claim 4 wherein the cylindrical member and flexible plate are fabricated of spring steel.

6. The valve as defined in claim 5 wherein the flow control means comprises;
   a bypass valve, rotatable between a first position in sealing engagement with the first seating surface and a second position in sealing engagement with the second seating surface.

7. The valve as defined in claim 6 wherein the valve includes actuator means comprising an axially movable member offset form the axis of rotation of the bypass valve and means connecting the axially moveable member to the bypass valve for converting the axial motion of the member to rotary motion to rotate the bypass valve.

8. The valve as defined in claim 5 wherein the flow control means comprises
   actuator means operatively connected to the bypass valve for rotating same to the second position in response to a control signal;
   means for generating a bias force upon the bypass valve to maintain same in sealing engagement with the first seating surface below fluid flow rates less than a predetermined level and for permitting the bypass valve to rotate against the bias force, under the action of the fluid force generated by diverted fluid to regulate fluid flow at the first outlet at the predetermined level.

9. The valve as defined in claim 8 wherein the valve includes actuator means comprising an axially movable member offset form the axis of rotation of the bypass valve and means connecting the axially movable member to the bypass valve for converting the axial motion of the member to rotary motion to rotate the bypass valve.

10. The valve as defined in claim 9 wherein the actuator means includes the bias means, and wherein the bias means is coupled to the axially movable member to urge same in a direction to urge the bypass valve toward the first seating surface.

* * * * *